(12) United States Patent
Horiguchi et al.

(10) Patent No.: US 10,821,781 B2
(45) Date of Patent: Nov. 3, 2020

(54) TIRE

(71) Applicant: SUMITOMO RUBBER INDUSTRIES, LTD., Kobe (JP)

(72) Inventors: Toshiki Horiguchi, Kobe (JP); Hiroshi Yamaoka, Kobe (JP); Yoshiaki Kanematsu, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 537 days.

(21) Appl. No.: 15/631,055

(22) Filed: Jun. 23, 2017

(65) Prior Publication Data

US 2018/0015789 A1 Jan. 18, 2018

(30) Foreign Application Priority Data

Jul. 12, 2016 (JP) .................................. 2016-137932

(51) Int. Cl.
*B60C 11/12* (2006.01)
*B60C 11/03* (2006.01)
*B60C 11/00* (2006.01)

(52) U.S. Cl.
CPC ...... *B60C 11/1218* (2013.01); *B60C 11/0008* (2013.01); *B60C 11/0306* (2013.01); *B60C 11/125* (2013.01); *B60C 11/1263* (2013.01); *B60C 11/1272* (2013.01); *B60C 2011/0369* (2013.01);
(Continued)

(58) Field of Classification Search
CPC ............. B60C 11/1204; B60C 11/0306; B60C 11/0008; B60C 11/1218; B60C 11/125;
(Continued)

(56) References Cited

U.S. PATENT DOCUMENTS

| 6,003,575 A * | 12/1999 | Koyama ................. B60C 11/12 |
| | | 152/209.18 |
| 6,220,321 B1 * | 4/2001 | Yoshioka ............ B60C 11/0306 |
| | | 152/209.18 |

(Continued)

FOREIGN PATENT DOCUMENTS

| CH | 561 615 A5 | 5/1975 |
| CH | 561615 A5 * | 5/1975 ......... B60C 11/0306 |

(Continued)

OTHER PUBLICATIONS

Machine translation of CH 561615 (no date).*

(Continued)

*Primary Examiner* — Steven D Maki
*Assistant Examiner* — Philip N Schwartz
(74) *Attorney, Agent, or Firm* — Oblon, McClelland, Maier & Neustadt, L.L.P.

(57) ABSTRACT

A tire includes a tread part having main grooves and lands demarcated by the main grooves. A crown land between a pair of crown main grooves includes first crown lug grooves extending from one crown groove to tire axial direction inner side and terminated within the crown land, second crown lug grooves extending from the other crown groove to the tire axial inner side and terminated within the crown land, and first crown sipes formed at tire circumferential direction positions and connecting the crown grooves, each first crown sipe includes a first side crown sipe piece extending from one crown groove to the tire axial inner side, a second side crown sipe piece not positioned on an extension line of the first side piece and extending from the other crown groove to the tire axial inner side, and a connecting crown sipe piece connecting the first and second sipe pieces.

20 Claims, 6 Drawing Sheets

(52) U.S. Cl.
CPC ............. *B60C 2011/0372* (2013.01); *B60C 2011/0381* (2013.01); *B60C 2011/0383* (2013.01); *B60C 2011/0386* (2013.01); *B60C 2011/1209* (2013.01); *B60C 2011/1213* (2013.01)

(58) Field of Classification Search
CPC ............. B60C 11/1272; B60C 11/1263; B60C 2011/1213; B60C 2011/0372; B60C 2011/0383; B60C 2011/0386; B60C 2011/0381; B60C 2011/1209; B60C 2011/0369
See application file for complete search history.

(56) References Cited

U.S. PATENT DOCUMENTS

| | | | | |
|---|---|---|---|---|
| 2007/0295435 | A1* | 12/2007 | Nguyen | B29D 30/0606 152/209.18 |
| 2010/0132864 | A1* | 6/2010 | Colombo | B60C 11/0302 152/209.8 |
| 2013/0153105 | A1* | 6/2013 | Bournat | B60C 11/0309 152/209.21 |
| 2016/0089938 | A1 | 3/2016 | Iwasaki | |
| 2016/0176235 | A1* | 6/2016 | Takayama | B60C 11/0306 152/209.2 |

FOREIGN PATENT DOCUMENTS

| | | | | |
|---|---|---|---|---|
| JP | 2010-285035 | A | 12/2010 | |
| JP | 2014227007 | A * | 12/2014 | ............. B60C 11/03 |

OTHER PUBLICATIONS

Machine translation of JP2014-227007 (no date).*
Extended European Search Report dated Nov. 21, 2017 in Patent Application No. 17179243.5.

* cited by examiner

TIRE

CROSS-REFERENCE TO RELATED APPLICATIONS

The present application is based upon and claims the benefit of priority to Japanese Patent Application No. 2016-137932, filed Jul. 12, 2016, the entire contents of which are incorporated herein by reference.

BACKGROUND OF THE INVENTION

Field of the Invention

The present invention relates to a tire that allows performance on snow and ice and steering stability to be improved in a well-balanced manner.

Description of Background Art

Japanese Patent Laid-Open Publication No. 2010-285035 describes a tire in which edges of main grooves are extending in a tire circumferential direction into zigzag shapes and a large number of sipes is provided. The entire contents of this publication are incorporated herein by reference.

SUMMARY OF THE INVENTION

According to one aspect of the present invention, a tire includes a tread part having main grooves each continuously extending in a tire circumferential direction, and land portions demarcated by the main grooves. The main grooves include a pair of crown main grooves, the land portions include a crown land portion demarcated between the pair of crown main grooves, the crown land portion includes first crown lug grooves each extending from one of the crown main grooves to a tire axial direction inner side and terminated within the crown land portion, second crown lug grooves each extending from the other one of the crown main grooves to the tire axial direction inner side and terminated within the crown land portion, and first crown sipes formed respectively at tire circumferential direction positions different from positions of the first and second crown lug grooves and each communicatively connecting the pair of crown main grooves, each of the first crown sipes includes a first side crown sipe piece extending from one of the crown main grooves to the tire axial direction inner side, a second side crown sipe piece not positioned on an extension line of the first side crown sipe piece and extending from the other one of the crown main grooves to the tire axial direction inner side, and a connecting crown sipe piece connecting the first side crown sipe piece and the second side crown sipe piece.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
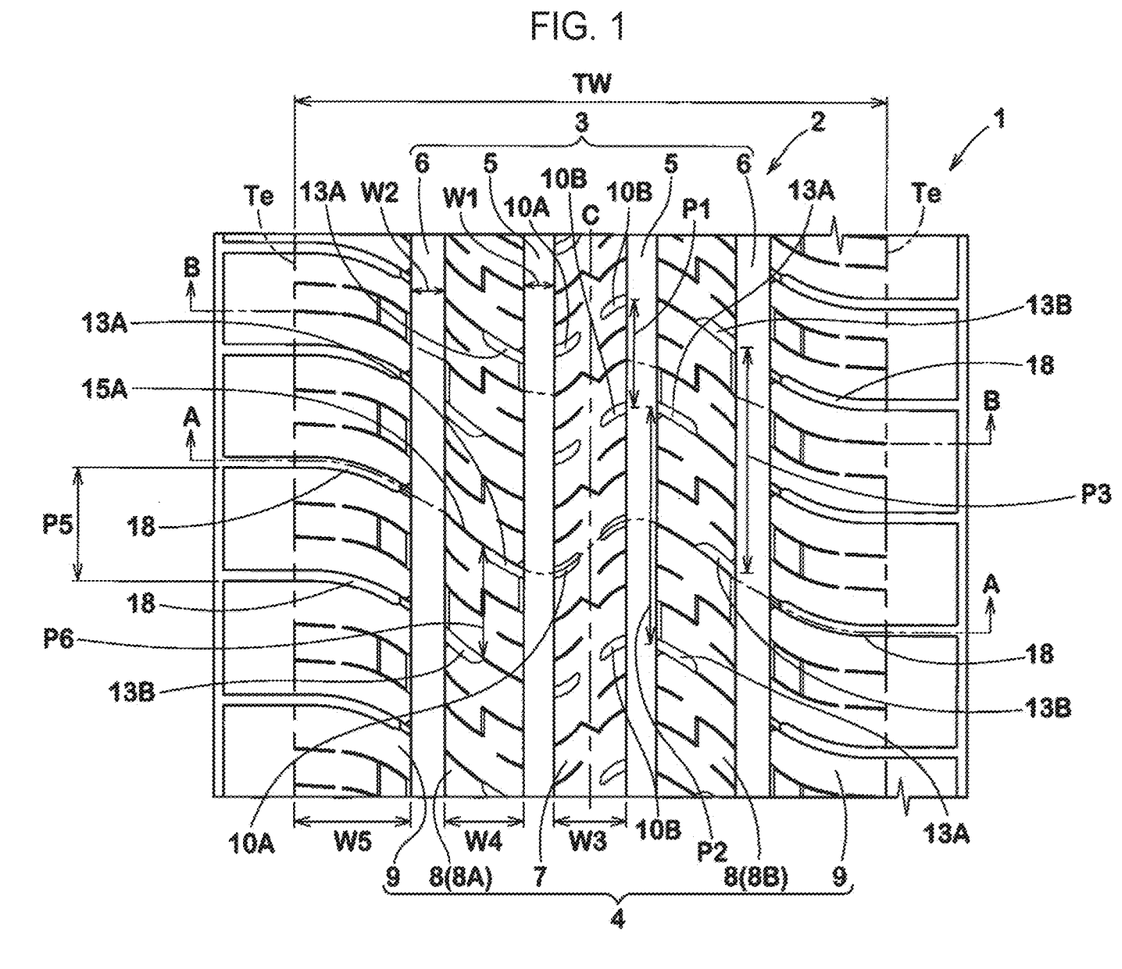
FIG. 1 is a developed view illustrating an embodiment of a tread part of a tire of the present invention.

FIG. 1 is a developed view of a tread part 2 of a tire 1 of the present embodiment. As illustrated in FIG. 1, in the tread part 2 of the tire 1 of the present embodiment, multiple main grooves 3 that each continuously extend in a tire circumferential direction and multiple land portions 4 that are demarcated by the main grooves 3 are provided.

The main grooves 3 of the present embodiment include a pair of crown main grooves 5 and a pair of shoulder main grooves 6 that are each formed between a crown main groove 5 and a tread edge (Te). It is desirable that the crown main grooves 5 be respectively formed on both sides of a tire equator (C).

Here, the term "tread edge" (Te) refers to a tire axial direction outermost edge of a ground contact surface when a normal load is loaded to the tire 1 in a normal state and the tire 1 is grounded on a flat surface at a camber angle of 0 degree. A tire axial direction distance between the tread edges (Te) is defined as a tread ground contact width (TW).

The term "normal state" refers to a no-load state in which the tire 1 is mounted to a normal rim (not illustrated in the drawings) and is filled with air at a normal pressure. In the present specification, unless otherwise specified, values of dimensions of the parts of the tire 1 are values measured in the normal state. Further, unless otherwise specified, a groove width of each of the grooves is measured in a direction orthogonal to a longitudinal direction of the groove.

The term "normal rim" refers to a rim for which standards are set for each tire in a system of standards that includes standards on which the tire 1 is based. For example, the term "normal rim" refers to a "Standard Rim" in the JATMA standards, a "Design Rim" in the TRA standards, or a "Measuring Rim" in the ETRTO standards.

The term "normal pressure" refers to an air pressure for which standards are set for each tire in a system of standards that includes the standards on which the tire 1 is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

The term "normal load" refers to a load for which standards are set for each tire in a system of standards that includes the standards on which the tire 1 is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

It is desirable that the crown main grooves 5 each have a substantially constant groove width (W1) and linearly extend. The groove width (W1) of each of the crown main grooves 5 is preferably 4%-6% of the tread ground contact width (TW).

It is desirable that the shoulder main grooves 6 each have a substantially constant groove width (W2) and linearly extend. The groove width (W2) of each of the shoulder main grooves 6 is preferably 5%-7% of the tread ground contact width (TW). It is desirable that a groove width (W2) of each of the shoulder main grooves 6 be larger than the groove width (W1) of each of the crown main grooves 5.

Figure 2:
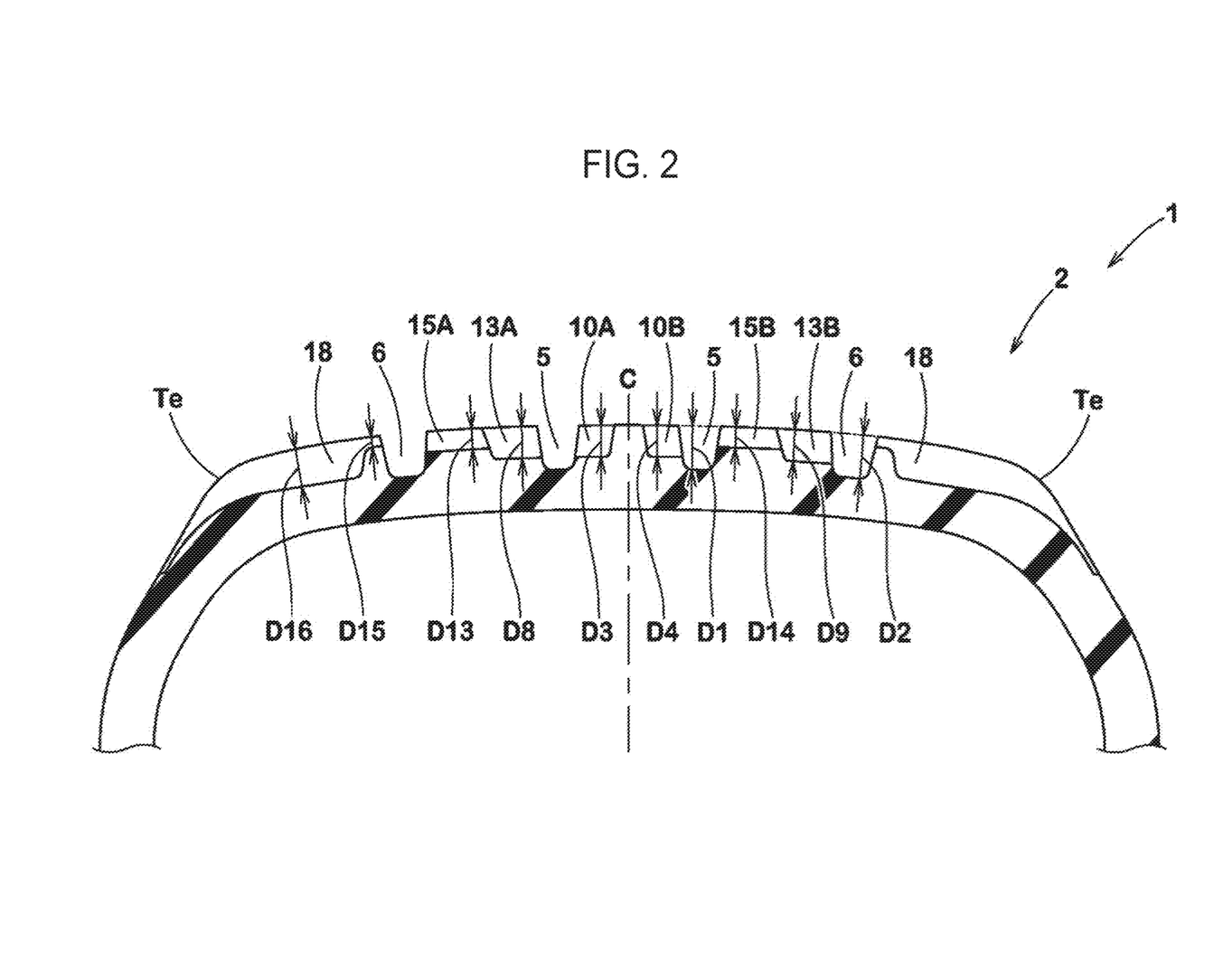
FIG. 2 is a cross-sectional view along an A-A line of FIG. 1.

FIG. 2 is a cross-sectional view along an A-A line of FIG. 1. As illustrated in FIG. 2, it is desirable that a groove depth (D1) of each of the crown main grooves 5 be substantially equal to or larger than a groove depth (D2) of each of the shoulder main grooves 6.

As illustrated in FIG. 1, the land portions 4 of the present embodiment include a crown land portion 7 demarcated between the pair of the crown main grooves 5, a pair of middle land portions 8 that are each demarcated by a crown main groove 5 and a shoulder main groove 6, and a pair of shoulder land portions 9 that are each demarcated by a shoulder main groove 6 and a tread edge (Te).

It is desirable that the crown land portion 7 be formed on the tire equator (C). A tire axial direction width (W3) of the crown land portion 7 is preferably 10%-15% of the tread ground contact width (TW).

Figure 3:
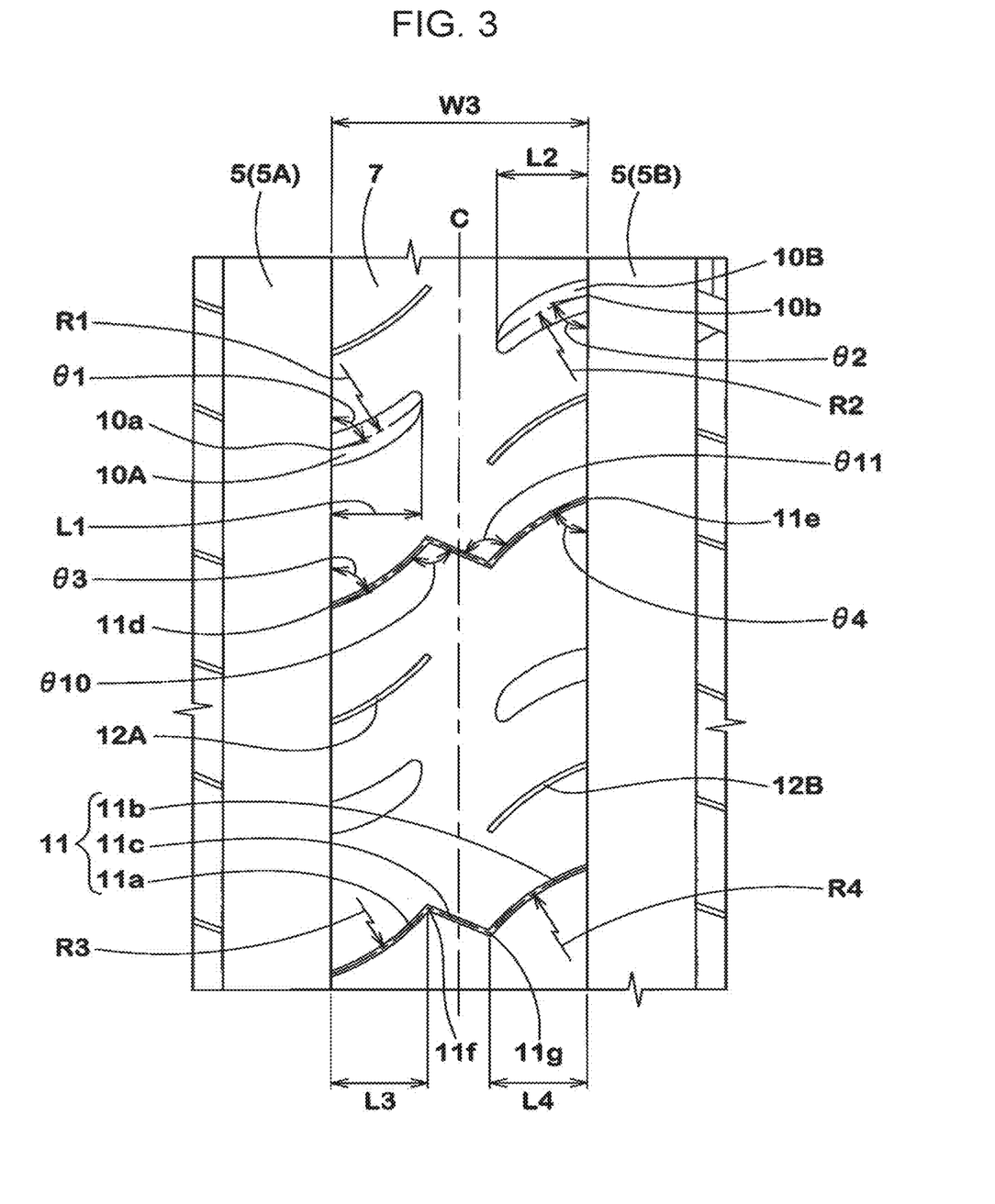
FIG. 3 is a partial enlarged view of a crown land portion.

FIG. 3 is a partial enlarged view of the crown land portion 7. As illustrated in FIG. 3, the crown land portion 7 of the present embodiment has multiple first crown lug grooves (10A) that each extend from one crown main groove (5A) to a tire axial direction inner side and multiple second crown lug grooves (10B) that each extend from the other crown main groove (5B) to a tire axial direction inner side. Due to the first crown lug grooves (10A) and the second crown lug grooves (10B), the crown land portion 7 allows a high snow column shearing force to be obtained, and can improve the performance on snow and ice of the tire 1.

It is desirable that the first crown lug grooves (10A) and the second crown lug grooves (10B) be each terminated within the crown land portion 7. Such first crown lug grooves (10A) and second crown lug grooves (10B) can suppress a decrease in rigidity of the crown land portion 7 and allow excellent steering stability of the tire 1 on a dry road surface to be achieved.

A tire axial direction length (L1) of each of the first crown lug grooves (10A) is preferably 20%-45% of the width (W3) of the crown land portion 7. A tire axial direction length (L2) of each of the second crown lug grooves (10B) is preferably 20%-45% of the width (W3) of the crown land portion 7. It is desirable that the tire axial direction length (L1) of each of the first crown lug grooves (10A) and the tire axial direction length (L2) of each of the second crown lug grooves (10B) be substantially equal to each other.

The first crown lug grooves (10A) and the second crown lug grooves (10B) of the present embodiment each extend in an arc shape. It is desirable that each of the first crown lug grooves (10A) and each of the second crown lug grooves (10B) respectively have arcs that are convex in different directions from each other. Such first crown lug grooves (10A) and second crown lug grooves (10B) can suppress a localized decrease in rigidity of the crown land portion 7.

A curvature radius (R1) of a groove center line of each of the first crown lug grooves (10A) is preferably 10-30 mm. A curvature radius (R2) of a groove center line of each of the second crown lug grooves (10B) is preferably 10-30 mm. It is desirable that the curvature radius (R1) of each of the first crown lug grooves (10A) and the curvature radius (R2) of each of the second crown lug grooves (10B) be substantially equal to each other.

The first crown lug grooves (10A) and the second crown lug grooves (10B) of the present embodiment are inclined in the same direction. Such first crown lug grooves (10A) and second crown lug grooves (10B) can efficiently disperse force acting on the crown land portion 7.

An angle (θ1) of each of the first crown lug grooves (10A) with respect to the tire circumferential direction at a communicating part (10a) between the each of the first crown lug grooves (10A) and the crown main groove 5 is preferably 40-80 degrees. An angle (θ2) of each of the second crown lug grooves (10B) with respect to the tire circumferential direction at a communicating part (10b) between the each of the second crown lug grooves (10B) and the crown main groove 5 is preferably 40-80 degrees. It is desirable that the angle (θ1) of each of the first crown lug grooves (10A) and the angle (θ2) of each of the second crown lug grooves (10B) be substantially equal to each other.

As illustrated in FIG. 2, in the present embodiment, a groove depth (D3) of each of the first crown lug grooves (10A) and a groove depth (D4) of each of the second crown lug grooves (10B) are substantially equal to each other. It is desirable that the groove depth (D3) of each of the first crown lug grooves (10A) and the groove depth (D4) of each of the second crown lug grooves (10B) be smaller than the groove depth (D1) of each of the crown main grooves 5. Such first crown lug grooves (10A) and second crown lug grooves (10B) suppress a decrease in the rigidity of the crown land portion 7 and allow a high snow column shearing force to be obtained.

As illustrated in FIG. 3, the crown land portion 7 of the present embodiment further has first crown sipes 11 each of which communicatively connects the pair of the crown main grooves 5. It is desirable that the first crown sipes 11 be formed at tire circumferential direction positions different from those of the first crown lug grooves (10A) and the second crown lug grooves (10B). Such first crown sipes 11 can suppress a decrease in the rigidity of the crown land portion 7 and allow excellent steering stability of the tire 1 to be achieved. Further, the first crown sipes 11 can achieve an edge effect in both the tire circumferential direction and the tire axial direction and thus allow performance on snow and ice of the tire 1 in a front-rear direction and a left-right direction to be improved.

The first crown sipes 11 of the present embodiment each include a one-side crown sipe piece (11a) that extends from the crown main groove (5A) to a tire axial direction inner side and an other-side crown sipe piece (11b) that extends from the crown main groove (5B) to a tire axial direction inner side. The first crown sipes 11 further each include a connecting crown sipe piece (11c) that connects the one-side crown sipe piece (11a) and the other-side crown sipe piece (11b).

In the present embodiment, the other-side crown sipe piece (11b) is formed at a position that is not on an extension line of the one-side crown sipe piece (11a). It is desirable that the one-side crown sipe piece (11a) and the other-side crown sipe piece (11b) be each terminated within the crown land portion 7. Such one-side crown sipe piece (11a) and other-side crown sipe piece (11b) allow each of the first crown sipes 11 to have inflection points and thereby can efficiently disperse force acting on the crown land portion 7.

A tire axial direction length (L3) of the one-side crown sipe piece (11a) is preferably 30%-45% of the width (W3) of the crown land portion 7. A tire axial direction length (L4) of the other-side crown sipe piece (11b) is preferably 30%-45% of the width (W3) of the crown land portion 7. It is desirable that the tire axial direction length (L3) of the one-side crown sipe piece (11a) and the tire axial direction length (L4) of the other-side crown sipe piece (11b) be substantially equal to each other.

In the present embodiment, the one-side crown sipe piece (11a) and the other-side crown sipe piece (11b) each extend in an arc shape. Such one-side crown sipe piece (11a) and other-side crown sipe piece (11b) can suppress a localized decrease in the rigidity of the crown land portion 7.

It is desirable that the one-side crown sipe piece (11a) and the other-side crown sipe piece (11b) respectively have arcs that are convex in different directions from each other. Further, it is desirable that the one-side crown sipe piece (11a) and each of the first crown lug grooves (10A) respectively have arcs that are convex in the same direction. Further, it is desirable that the other-side crown sipe piece (11b) and each of the second crown lug grooves (10B) respectively have arcs that are convex in the same direction.

A curvature radius (R3) of the one-side crown sipe piece (11a) is preferably 10-30 mm. A curvature radius (R4) of the other-side crown sipe piece (11b) is preferably 10-30 mm. It is desirable that the curvature radius (R3) of the one-side crown sipe piece (11a) and the curvature radius (R4) of the other-side crown sipe piece (11b) be substantially equal to each other.

In the present embodiment, the one-side crown sipe piece (11a) and the other-side crown sipe piece (11b) are inclined in the same direction. It is desirable that the one-side crown sipe piece (11a) and the other-side crown sipe piece (11b) be inclined in the same direction as the first crown lug grooves (10A) and the second crown lug grooves (10B). Such one-side crown sipe piece (11a) and other-side crown sipe piece (11b) can efficiently disperse force acting on the crown land portion 7.

An angle ($\theta 3$) of the one-side crown sipe piece (11a) with respect to the tire circumferential direction at a communicating part (11d) between the one-side crown sipe piece (11a) and the crown main groove 5 is preferably 30-60 degrees. An angle ($\theta 4$) of the other-side crown sipe piece (11b) with respect to the tire circumferential direction at a communicating part (11e) between the other-side crown sipe piece (11b) and the crown main groove 5 is preferably 30-60 degrees. It is desirable that the angle ($\theta 3$) of the one-side crown sipe piece (11a) and the angle ($\theta 4$) of the other-side crown sipe piece (11b) be substantially equal to each other.

Figure 4:
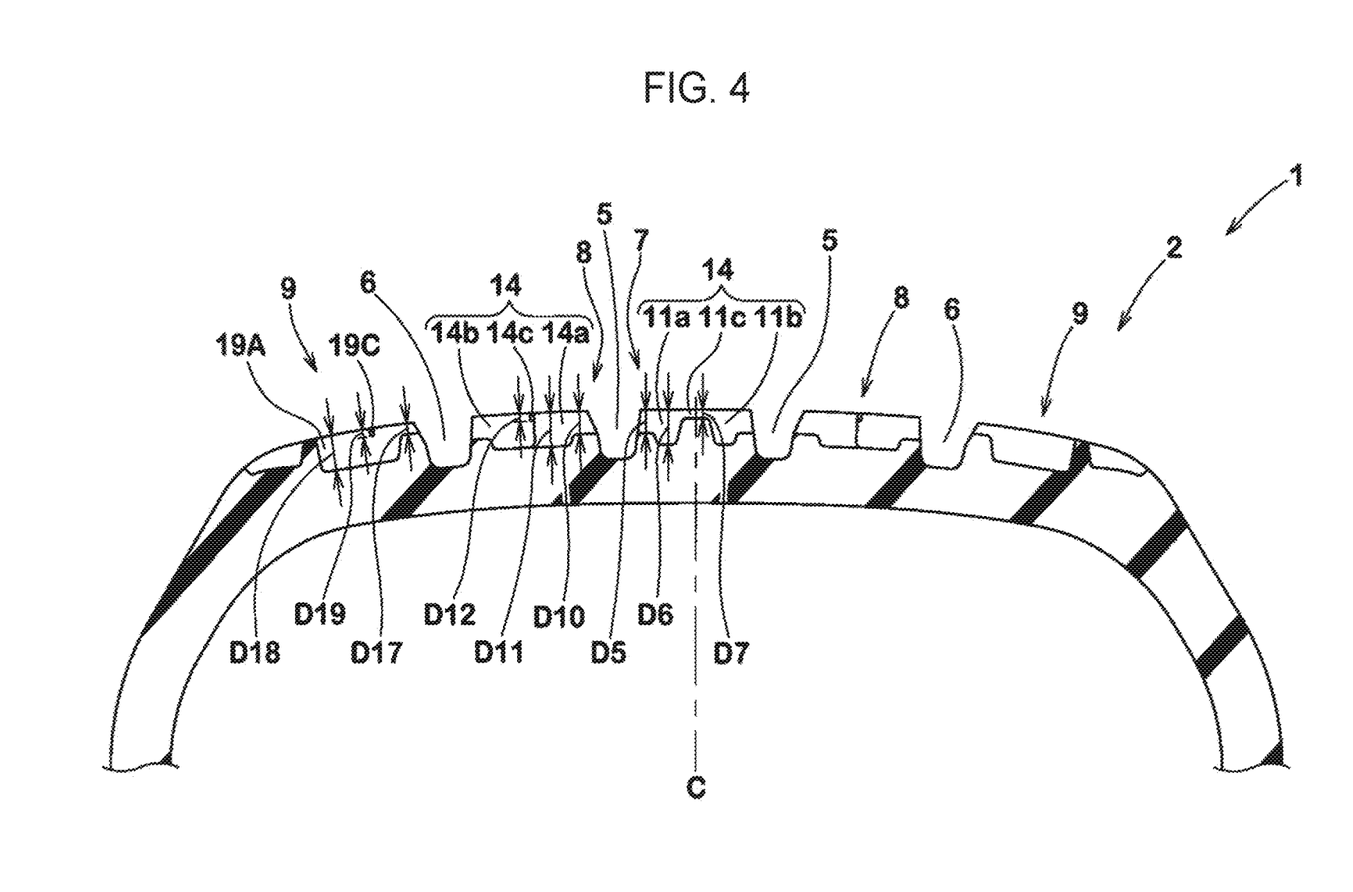
FIG. 4 is a cross-sectional view along a B-B line of FIG. 1.

FIG. 4 is a cross-sectional view along a B-B line of FIG. 1. As illustrated in FIG. 4, the one-side crown sipe piece (11a) of the present embodiment has a 2-stage structure in which a depth (D5) on the crown main groove 5 side is smaller than a depth (D6) on the tire equator (C) side. The other-side crown sipe piece (11b) of the present embodiment also has a similar 2-stage structure. Such one-side crown sipe piece (11a) and other-side crown sipe piece (11b) respectively have inflection points at their bottoms and thereby can efficiently disperse force acting on the crown land portion 7.

As illustrated in FIG. 3, it is desirable that the connecting crown sipe piece (11c) connect a termination point (11f) of the one-side crown sipe piece (11a) in the crown land portion 7 and a termination point (11g) of the other-side crown sipe piece (11b) in the crown land portion 7. The connecting crown sipe piece (11c) of the present embodiment linearly extends. For example, the connecting crown sipe piece (11c) is formed so as to cross the tire equator (C).

The connecting crown sipe piece (11c) of the present embodiment is inclined in an opposite direction to that of the one-side crown sipe piece (11a) and the other-side crown sipe piece (11b). Such a connecting crown sipe piece (11c) can achieve an edge effect in a different direction from the one-side crown sipe piece (11a) and the other-side crown sipe piece (11b).

An angle ($\theta 10$) between the connecting crown sipe piece (11c) and the one-side crown sipe piece (11a) and an angle ($\theta 11$) between the connecting crown sipe piece (11c) and the other-side crown sipe piece (11b) are preferably each 90-150 degrees.

As illustrated in FIG. 4, in the present embodiment, a depth (D7) of the connecting crown sipe piece (11c) is smaller than the depth (D5) of the one-side crown sipe piece (11a) on the crown main groove 5 side. That is, the connecting crown sipe piece (11c) has a smaller depth (D7) than the one-side crown sipe piece (11a) and the other-side crown sipe piece (11b). Such a connecting crown sipe piece (11c) can suppress a decrease in the rigidity of the crown land portion 7 and improve the steering stability of the tire 1, and, due to the edge effect thereof, can improve the performance on snow and ice of the tire 1.

As illustrated in FIG. 3, the crown land portion 7 of the present embodiment further has second crown sipes (12A) that each extend from one crown main groove (5A) to a tire axial direction inner side and third crown sipes (12B) that each extend from the other crown main groove (5B) to a tire axial direction inner side.

It is desirable that the second crown sipes (12A) and the third crown sipes (12B) be each terminated within the crown land portion 7. Further, it is desirable that the second crown sipes (12A) and the third crown sipes (12B) each extend in an arc shape and be inclined in the same direction as the one-side crown sipe piece (11a) and the other-side crown sipe piece (11b).

In the present embodiment, each of the second crown sipes (12A) and the one-side crown sipe piece (11a) have substantially the same tire axial direction length, curvature radius, arc orientation and inclination angle with respect to the tire circumferential direction. Similarly, each of the third crown sipes (12B) and the other-side crown sipe piece (11b) have substantially the same tire axial direction length, curvature radius, arc orientation and inclination angle with respect to the tire circumferential direction. On the other hand, although not illustrated in the drawings, it is desirable that the second crown sipes (12A) and the third crown sipes (12B) each have a substantially constant depth.

In the tire circumferential direction, each of the second crown sipes (12A) of the present embodiment is positioned on the other-side crown sipe piece (11b) side of the one-side crown sipe piece (11a). Similarly, each the third crown sipes (12B) of the present embodiment is positioned on the one-side crown sipe piece (11a) side of the other-side crown sipe piece (11b). Such second crown sipes (12A) and third crown sipes (12B) can achieve an edge effect while suppressing a decrease in the rigidity of the crown land portion 7.

As illustrated in FIG. 1, it is desirable that the pair of the middle land portions 8 be respectively formed on tire axial direction outer sides of the crown land portion 7. A tire axial direction width (W4) of each of the middle land portions 8 is preferably 11%-16% of the tread ground contact width (TW). It is desirable that the width (W4) of each of the middle land portions 8 be larger than the width (W3) of the crown land portion 7.

The middle land portions 8 of the present embodiment each have multiple first middle lug grooves (13A) that each extend from a crown main groove 5 to a tire axial direction outer side and multiple second middle lug grooves (13B) that each extend from a shoulder main groove 6 to a tire axial direction inner side. Due to the first middle lug grooves (13A) and second middle lug grooves (13B), the middle land portions 8 allow a high snow column shearing force to be obtained and can improve the performance on snow and ice of the tire 1.

It is desirable that the first middle lug grooves (13A) and the second middle lug grooves (13B) be alternately provided in the tire circumferential direction. Therefore, a tire circumferential direction pitch (P2) of the first middle lug grooves (13A) is two times a tire circumferential direction pitch (P1) of the first crown lug grooves (10A) or the second crown lug grooves (10B). Similarly, a tire circumferential direction pitch (P3) of the second middle lug grooves (13B) is two times the tire circumferential direction pitch (P1) of the first crown lug grooves (10A) or the second crown lug grooves (10B).

It is desirable that each of the first middle lug grooves (13A) oppose a first crown lug groove (10A) or a second crown lug groove (10B) across a crown main groove 5. Such first middle lug grooves (13A) cooperate with the first crown lug grooves (10A) or the second crown lug grooves (10B) to allow a higher snow column shearing force to be obtained.

It is desirable that the first middle lug grooves (13A) and the second middle lug grooves (13B) be each terminated within a middle land portion 8. Such first middle lug grooves (13A) and second middle lug grooves (13B) suppress a decrease in rigidity of the middle land portions 8 and allow excellent steering stability of the tire 1 on a dry road surface to be achieved.

Figure 5:
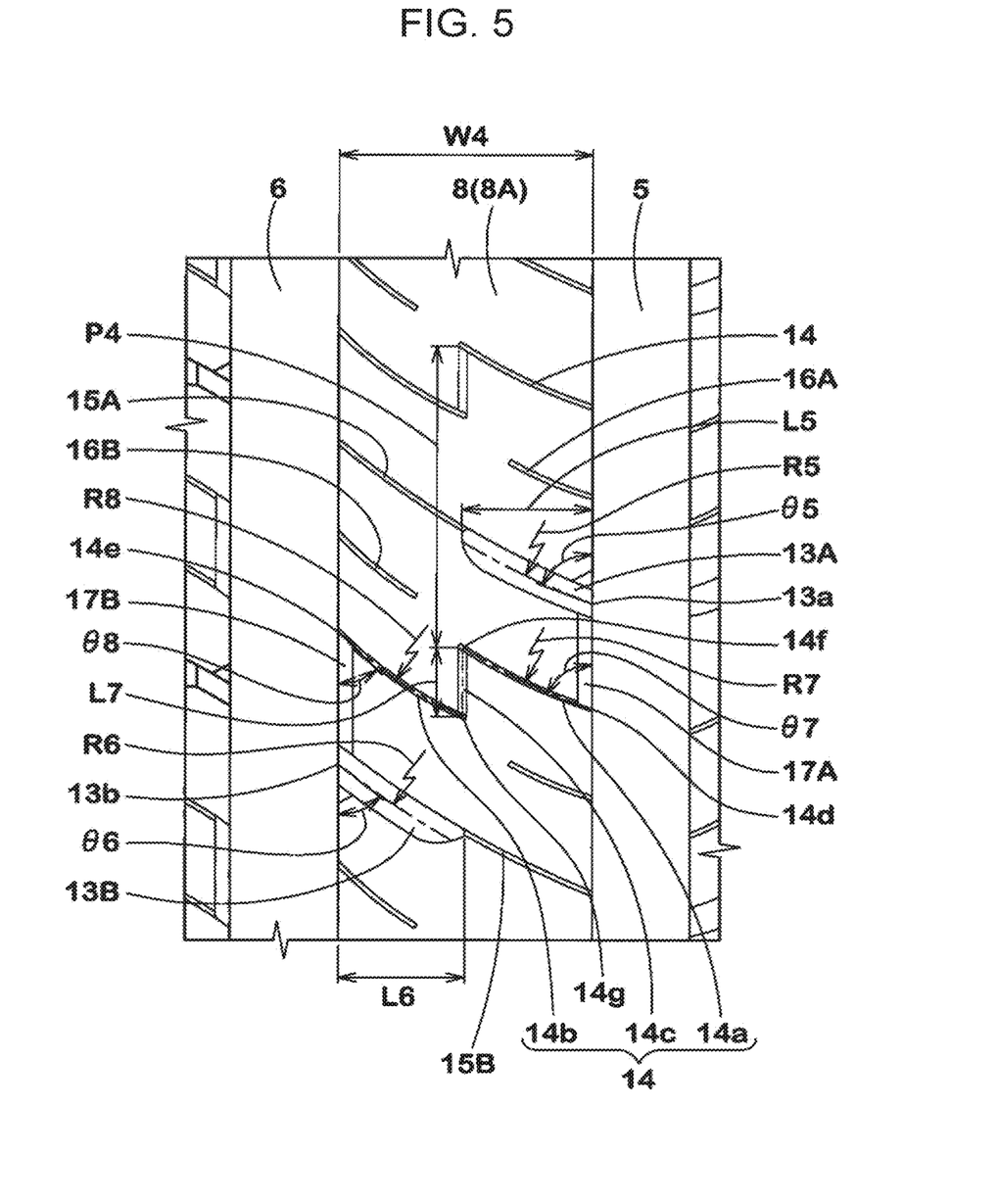
FIG. 5 is a partial enlarged view of a middle land portion.

FIG. 5 is a partial enlarged view of a middle land portion 8. As illustrated in FIG. 5, a tire axial direction length (L5) of each of the first middle lug grooves (13A) is preferably 30%-70% of the width (W4) of each of the middle land portions 8. A tire axial direction length (L6) of each of the second middle lug grooves (13B) is preferably 30%-70% of the width (W4) of each of the middle land portions 8.

The first middle lug grooves (13A) and the second middle lug grooves (13B) of the present embodiment each extend in an arc shape. Such first middle lug grooves (13A) and second middle lug grooves (13B) can suppress a localized decrease in the rigidity of the middle land portions 8.

As illustrated in FIG. 1, in each of the middle land portions 8, it is desirable that each of the first middle lug grooves (13A) and each of the second middle lug grooves (13B) respectively have arcs that are convex in the same direction. On the other hand, it is desirable that each of the first middle lug grooves (13A) and the second middle lug grooves (13B) of a middle land portion (8A) on one side of the tire equator (C) and each of the first middle lug grooves (13A) and the second middle lug grooves (13B) of a middle land portion (8B) on the other side of the tire equator (C) respectively have arcs that are convex in different directions from each other.

Further, it is desirable that each of the first middle lug grooves (13A) and the second middle lug grooves (13B) of the middle land portion (8A) on one side and each of the first crown lug grooves (10A) respectively have arcs that are convex in the same direction. Further, it is desirable that each of the first middle lug grooves (13A) and the second middle lug grooves (13B) of the middle land portion (8B) on the other side and each of the second crown lug grooves (10B) respectively have arcs that are convex in the same direction.

As illustrated in FIG. 5, a curvature radius (R5) of each of the first middle lug grooves (13A) is preferably 80-110 mm. A curvature radius (R6) of each of the second middle lug grooves (13B) is preferably 80-110 mm. It is desirable that the curvature radius (R5) of each of the first middle lug grooves (13A) and the curvature radius (R6) of each of the second middle lug grooves (13B) be substantially equal to each other.

As illustrated in FIG. 1, in the present embodiment, the first middle lug grooves (13A) and the second middle lug grooves (13B) are inclined in an opposite direction to that of the first crown lug grooves (10A) and the second crown lug grooves (10B). Such first middle lug grooves (13A) and second middle lug grooves (13B) can cooperate with the first crown lug grooves (10A) and the second crown lug grooves (10B) to more efficiently disperse force acting on the tread part 2.

As illustrated in FIG. 5, an angle ($\theta 5$) of each of the first middle lug grooves (13A) with respect to the tire circumferential direction at a communicating part (13a) between the each of the first middle lug grooves (13A) and the crown main groove 5 is preferably 40-70 degrees. An angle ($\theta 6$) of each of the second middle lug grooves (13B) with respect to the tire circumferential direction at a communicating part (13b) between the each of the second middle lug grooves (13B) and the shoulder main groove 6 is preferably 30-60 degrees.

As illustrated in FIG. 2, in the present embodiment, a groove depth (D8) of each of the first middle lug grooves (13A) and a groove depth (D9) of each of the second middle lug grooves (13B) are substantially equal to each other. It is desirable that the groove depth (D8) of each of the first middle lug grooves (13A) and the groove depth (D9) of each of the second middle lug grooves (13B) be substantially equal to the groove depth (D3) of each of the first crown lug grooves (10A) and the groove depth (D4) of each of the second crown lug grooves (10B). Such first middle lug grooves (13A) and second middle lug grooves (13B) suppress a decrease in the rigidity of the middle land portions 8 and allow a high snow column shearing force to be obtained.

As illustrated in FIG. 5, the middle land portions 8 of the present embodiment further each have first middle sipes 14 that each communicatively connect from a crown main groove 5 to a shoulder main groove 6. It is desirable that the first middle sipes 14 be each provided between a first middle lug groove (13A) and a second middle lug groove (13B) in the tire circumferential direction. Such first middle sipes 14 suppress a decrease in the rigidity of the middle land portions 8 and allow excellent steering stability of the tire 1 to be achieved. Further, due to an edge effect, the first middle sipes 14 can improve the performance on snow and ice of the tire 1.

The first middle sipes 14 of the present embodiment each include a crown side middle sipe piece (14a) that extends from a crown main groove 5 to a tire axial direction outer side and a shoulder side middle sipe piece (14b) that extends from a shoulder main groove 6 to a tire axial direction inner side. The first middle sipes 14 further each include a connecting middle sipe piece (14c) that connects the crown side middle sipe piece (14a) and the shoulder side middle sipe piece (14b).

In the present embodiment, the shoulder side middle sipe piece (14b) is formed at a position that is not on an extension line of the crown side middle sipe piece (14a). It is desirable that the crown side middle sipe piece (14a) and the shoulder side middle sipe piece (14b) be each terminated within a middle land portion 8. Such crown side middle sipe piece (14a) and shoulder side middle sipe piece (14b) allow each of the first middle sipes 14 to have inflection points and thereby can efficiently disperse force acting on the middle land portions 8.

In the present embodiment, each of the crown side middle sipe piece (14a) and the shoulder side middle sipe piece (14b) extends in an arc shape. Such crown side middle sipe piece (14a) and shoulder side middle sipe piece (14b) can suppress a localized decrease in the rigidity of the middle land portions 8.

In each of the middle land portions 8, it is desirable that crown side middle sipe piece (14a) and the shoulder side middle sipe piece (14b) respectively have arcs that are convex in the same direction. Further, it is desirable that the crown side middle sipe piece (14a) and the shoulder side middle sipe piece (14b) and each of the first middle lug grooves (13A) and each of the second middle lug grooves (13B) respectively have arcs that are convex in the same direction.

A curvature radius (R7) of the crown side middle sipe piece (14a) is preferably 30-50 mm. A curvature radius (R8) of the shoulder side middle sipe piece (14b) is preferably 50-80 mm.

In the present embodiment, the crown side middle sipe piece (14a) and the shoulder side middle sipe piece (14b) are inclined in the same direction. Further, it is desirable that the crown side middle sipe piece (14a) and the shoulder side middle sipe piece (14b) be inclined in the same direction as the first middle lug grooves (13A) and the second middle lug grooves (13B). Such crown side middle sipe piece (14a) and shoulder side middle sipe piece (14b) can efficiently disperse force acting on the middle land portions 8.

An angle ($\theta 7$) of the crown side middle sipe piece (14a) with respect to the tire circumferential direction at a communicating part (14d) between the crown side middle sipe piece (14a) and the crown main groove 5 is preferably 40-70 degrees. An angle ($\theta 8$) of the shoulder side middle sipe piece (14b) with respect to the tire circumferential direction at a communicating part (14e) between the shoulder side middle sipe piece (14b) and the shoulder main groove 6 is preferably 30-60 degrees.

As illustrated in FIG. 4, the crown side middle sipe piece (14a) of the present embodiment has a 2-stage structure in which a depth (D10) on the crown main groove 5 side is smaller than a depth (D11) on the shoulder main groove 6 side. The shoulder side middle sipe piece (14b) of the present embodiment also has a similar 2-stage structure. Such crown side middle sipe piece (14a) and shoulder side middle sipe piece (14b) respectively have inflection points at their bottoms and thereby can efficiently disperse force acting on the middle land portions 8.

As illustrated in FIG. 5, it is desirable that the connecting middle sipe piece (14c) connect a termination point (14f) of the crown side middle sipe piece (14a) in the middle land portion 8 and a termination point (14g) of the shoulder side middle sipe piece (14b) in the middle land portion 8.

The connecting middle sipe piece (14c) of the present embodiment linearly extends along the tire circumferential direction. A tire circumferential direction length (L7) of the connecting middle sipe piece (14c) is preferably 10%-40% of a tire circumferential direction pitch (P4) of the first middle sipes 14. Such a connecting middle sipe piece (14c) can achieve an edge effect in a different direction from the crown side middle sipe piece (14a) and the shoulder side middle sipe piece (14b).

As illustrated in FIG. 4, in the present embodiment, a depth (D12) of the connecting middle sipe piece (14c) is smaller than the depth (D10) of the crown side middle sipe piece (14a) on the crown main groove 5 side. That is, the connecting middle sipe piece (14c) has a smaller depth (D12) than the crown side middle sipe piece (14a) and shoulder side middle sipe piece (14b). Such a connecting middle sipe piece (14c) can suppress a decrease in the rigidity of the middle land portions 8 and improve the steering stability of the tire 1, and, due to the edge effect thereof, can improve the performance on snow and ice of the tire 1.

As illustrated in FIG. 5, the middle land portions 8 of the present embodiment further each have second middle sipes (15A) that respectively connect the first middle lug grooves (13A) and a shoulder main groove 6 and third middle sipes (15B) that respectively connect the second middle lug grooves (13B) and a crown main groove 5.

It is desirable that the second middle sipes (15A) be respectively formed at positions on extension lines of the first middle lug grooves (13A) and each have substantially the same curvature radius as that of each of the first middle lug grooves (13A). Further, it is desirable that the third middle sipes (15B) be respectively formed at positions on extension lines of the second middle lug grooves (13B) and each have substantially the same curvature radius as that of each of the second middle lug grooves (13B).

As illustrated in FIG. 2, in the present embodiment, a depth (D13) of each of the second middle sipes (15A) is smaller than the groove depth (D8) of each of the first middle lug grooves (13A). Further, in the present embodiment, a depth (D14) of each of the third middle sipes (15B) is smaller than the groove depth (D9) of each of the second middle lug grooves (13B). Such second middle sipes (15A) and third middle sipes (15B) can suppress a decrease in the rigidity of the middle land portions 8 and improve the steering stability of the tire 1, and, due to an edge effect thereof, can improve the performance on snow and ice of the tire 1.

As illustrated in FIG. 5, the middle land portions 8 of the present embodiment further each have fourth middle sipes (16A) that each extend from a crown main groove 5 to a tire axial direction outer side and fifth middle sipes (16B) that each extend from a shoulder main groove 6 to a tire axial direction inner side.

It is desirable that the fourth middle sipes (16A) and the fifth middle sipes (16B) be each terminated within a middle land portion 8. Further, it is desirable that the fourth middle sipes (16A) and the fifth middle sipes (16B) each extend in an arc shape and be inclined in the same direction as the one-side crown sipe piece (11a) and the other-side crown sipe piece (11b).

In the present embodiment, each of the fourth middle sipes (16A) and the crown side middle sipe piece (14a) have substantially the same curvature radius, arc orientation and inclination angle with respect to the tire circumferential direction. Similarly, each of the fifth middle sipes (16B) and the shoulder side middle sipe piece (14b) have substantially the same curvature radius, arc orientation and inclination angle with respect to the tire circumferential direction.

On the other hand, it is desirable that a tire axial direction length of each of the fourth middle sipes (16A) and the fifth middle sipes (16B) be smaller than a tire axial direction length of each of the crown side middle sipe piece (14a) and the shoulder side middle sipe piece (14b). Further, it is desirable that the fourth middle sipes (16A) and the fifth middle sipes (16B) each have a constant depth.

In the tire circumferential direction, each of the fourth middle sipes (16A) of the present embodiment is positioned on the shoulder side middle sipe piece (14b) side of the crown side middle sipe piece (14a). Similarly, each of the fifth middle sipes (16B) of the present embodiment is positioned on the crown side middle sipe piece (14a) side of the shoulder side middle sipe piece (14b). Such fourth middle sipes (16A) and fifth middle sipes (16B) can achieve an edge effect while suppressing a decrease in the rigidity of the middle land portions 8.

In the middle land portions 8, further, first chamfered portions (17A) are each formed at a land portion edge between a first middle lug groove (13A) and a crown side middle sipe piece (14a); and second chamfered portions (17B) are each formed at a land portion edge between a second middle lug groove (13B) and a shoulder side middle sipe piece (14b). Such first chamfered portions (17A) and second chamfered portions (17B) can improve a snow column shearing force while suppressing a decrease in the rigidity of the middle land portions 8.

As illustrated in FIG. 1, it is desirable that the pair of the shoulder land portions 9 be respectively formed on tire axial direction outer sides of the middle land portions 8. A tire axial direction width (W5) of each of the shoulder land portions 9 is preferably 15%-23% of the tread ground contact width (TW). It is desirable that the width (W5) of each of the shoulder land portions 9 be larger than the width (W3) of the crown land portion 7 and the width (W4) of each of the middle land portions 8.

The shoulder land portions 9 of the present embodiment each have multiple shoulder transverse grooves 18 that each communicatively connect from a shoulder main groove 6 to a tread edge (Te). Due to the shoulder transverse grooves 18, the shoulder land portions 9 allow a high snow column shearing force to be obtained and can improve the performance on snow and ice of the tire 1.

It is desirable that each of the shoulder transverse grooves 18 oppose a second middle lug groove (13B) or a second middle sipe (15A) across a shoulder main groove 6. Each of the shoulder transverse grooves 18, for example, has an arc that is convex in a direction different from the second middle lug groove (13B) or the second middle sipe (15A) to which the shoulder transverse groove 18 opposes.

It is desirable that a tire circumferential direction pitch (P5) of the shoulder transverse grooves 18 be substantially equal to a tire circumferential direction pitch (P6) between the first middle lug grooves (13A) and the second middle lug grooves (13B). Such shoulder transverse grooves 18 cooperate with the first crown lug grooves (10A) or second crown lug grooves (10B) to allow a higher snow column shearing force to be obtained and can improve the performance on snow and ice of the tire 1.

Figure 6:
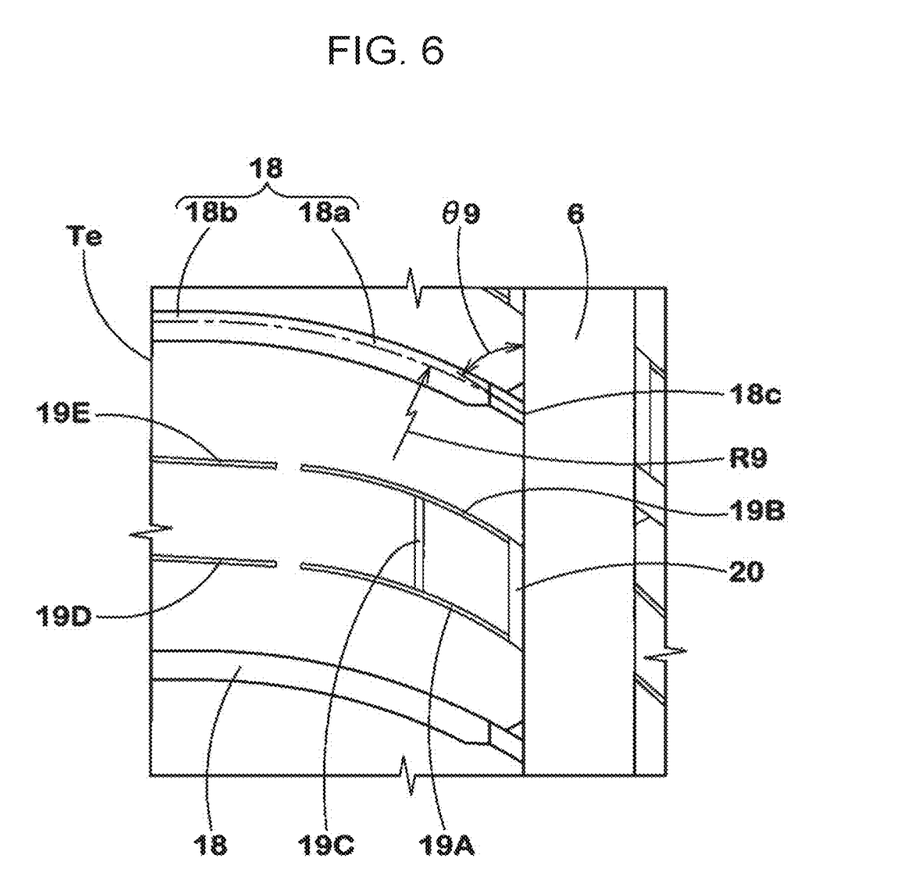
FIG. 6 is a partial enlarged view of a shoulder land portion.

FIG. 6 is a partial enlarged view of a shoulder land portion 9. As illustrated in FIG. 6, the shoulder transverse grooves 18 of the present embodiment each include a first shoulder transverse groove portion (18a) that extends in an arc shape on the shoulder main groove 6 side and a second shoulder transverse groove portion (18b) that linearly extends along the tire axial direction on the tread edge (Te) side. A curvature radius (R9) of the first shoulder transverse groove portion (18a) is preferably 30-50 mm.

In the present embodiment, the first shoulder transverse groove portion (18a) is inclined in the same direction as the first middle lug grooves (13A) and the second middle lug grooves (13B) (illustrated in FIG. 1). An angle (θ9) of the first shoulder transverse groove portion (18a) with respect to the tire circumferential direction at a communicating part (18c) between the shoulder transverse groove 18 and the shoulder main groove 6 is preferably 40-70 degrees. Such first shoulder transverse groove portions (18a) can cooperate with the first middle lug grooves (13A) and second middle lug grooves (13B) to more efficiently disperse a force acting on the tread part 2.

As illustrated in FIG. 2, the shoulder transverse grooves 18 of the present embodiment each have a 2-stage structure in which a groove depth (D15) on the shoulder main groove 6 side is smaller than a groove depth (D16) on the tread edge (Te) side. Such shoulder transverse grooves 18 respectively have inflection points at their bottoms and thereby can efficiently disperse force acting on the shoulder land portions 9.

As illustrated in FIG. 6, the shoulder land portions 9 of the present embodiment further each have a first shoulder sipe (19A) and a second shoulder sipe (19B) between each pair of shoulder transverse grooves 18 that are adjacent to each other in the tire circumferential direction.

It is desirable that the first shoulder sipes (19A) and the second shoulder sipes (19B) each extend from a shoulder main groove 6 to a tire axial direction outer side. Further, it is desirable that the first shoulder sipes (19A) and the second shoulder sipes (19B) be each terminated within a shoulder land portion 9. Such first shoulder sipes (19A) and second shoulder sipes (19B) can suppress a decrease in the rigidity of the shoulder land portions 9 and improve the steering stability of the tire 1, and, due to an edge effect thereof, can improve the performance on snow and ice of the tire 1.

In the present embodiment, each of the first shoulder sipes (19A) and each of the second shoulder sipes (19B) have substantially the same shape. It is desirable that the first shoulder sipes (19A) and the second shoulder sipes (19B) each extend in an arc shape and be each inclined in the same direction as the first shoulder transverse groove portion (18a). In the present embodiment, each of the first shoulder sipes (19A) and each of the second shoulder sipes (19B) and the first shoulder transverse groove portion (18a) have substantially the same curvature radius, arc orientation and inclination angle with respect to the tire circumferential direction.

As illustrated in FIG. 4, the first shoulder sipes (19A) each have a 2-stage structure in which a depth (D17) on the shoulder main groove 6 side is smaller than a depth (D18) on the tread edge (Te) side. The second shoulder sipes (19B) (not illustrated in FIG. 4) of the present embodiment also each have a similar 2-stage structure. Such first shoulder sipes (19A) and second shoulder sipes (19B) respectively have inflection points at their bottoms and thereby can efficiently disperse force acting on the shoulder land portions 9.

As illustrated in FIG. 6, the shoulder land portions 9 of the present embodiment further each have third shoulder sipes (19C) that communicatively connect between the first shoulder sipes (19A) and the second shoulder sipes (19B). It is desirable that the third shoulder sipes (19C) each communicatively connect between an arbitrary position of a first shoulder sipe (19A) and an arbitrary position of a second shoulder sipe (19B).

It is desirable that each of the third shoulder sipes (19C) linearly extends along the tire circumferential direction. Such third shoulder sipes (19C) can achieve an edge effect in a different direction from the first shoulder sipes (19A) and the second shoulder sipes (19B).

As illustrated in FIG. 4, in the present embodiment, a depth (D19) of each of the third shoulder sipes (19C) is smaller than the depth (D17) of each of the first shoulder sipes (19A) on the shoulder main groove 6 side. That is, the third shoulder sipes (19C) each have a smaller depth (D19) than each of the first shoulder sipes (19A) and the second shoulder sipes (19B). Such third shoulder sipes (19C) can suppress a decrease in the rigidity of the shoulder land portions 9 and improve the steering stability of the tire 1, and, due to the edge effect thereof, can improve the performance on snow and ice of the tire 1.

As illustrated in FIG. 6, the shoulder land portions 9 of the present embodiment further each have fourth shoulder sipes (19D) and fifth shoulder sipes (19E) that each extend from a tread edge (Te) to a tire axial direction inner side.

The fourth shoulder sipes (19D), for example, are respectively positioned on tire axial direction outer sides of the first shoulder sipes (19A) and each linearly extend along the tire axial direction. The fifth shoulder sipes (19E), for example, are respectively positioned on tire axial direction outer sides of the second shoulder sipes (19B) and each linearly extend along the tire axial direction. Such fourth shoulder sipes (19D) and fifth shoulder sipes (19E) can cooperate with the first shoulder sipes (19A) and second shoulder sipes (19B) to achieve an edge effect.

The shoulder land portions 9 of the present embodiment further each have third chamfered portions 20 that are respectively formed at land portion edges between the first shoulder sipes (19A) and the second shoulder sipes (19B). Such third chamfered portions 20 can improve a snow column shearing force while suppressing a decrease in the rigidity of the shoulder land portions 9.

In the above, an embodiment of the present invention is described in detail. However, the present invention is not limited to the above-described embodiment illustrated in the drawings and can be embodied in various modified forms.

EXAMPLES

Tires each having a tread pattern of FIG. 1 are prototyped based on specifications shown in Table 1. The prototyped tires are mounted to a test vehicle, and performance on snow and ice and steering stability are tested. Common specifications and a test method of the test tires are as follows.

Vehicle used: Domestic medium-sized passenger car (front wheel drive car)
Front wheel tire size: 215/60R16
Internal pressure: 240 kPa Performance on Snow and Ice
The test vehicle to which the prototyped tires are mounted is driven to travel on a test course having a snowy and icy road surface, and steering stability during testing is evaluated based on sensory evaluation by a test driver. The result is expressed as an index number with a result of Comparative Example 1 as 100. A larger index number indicates a better steering stability.

Steering Stability
The test vehicle to which the prototyped tires were mounted is driven to travel on a test course having a dry road surface, and steering stability during testing is evaluated based on sensory evaluation by a test driver. The result is expressed as an index number with a result of Comparative Example 1 as 100. A larger index number indicates a better steering stability.

The test results are shown in Table 1.

TABLE 1

| | Comparative Example 1 | Comparative Example 2 | Example 1 | Example 2 | Example 3 | Example 4 | Example 5 | Example 6 | Example 7 | Example 8 | Example 9 |
|---|---|---|---|---|---|---|---|---|---|---|---|
| Ratio (L1/W3) (%) of first crown lug groove length (L1) to crown land portion width (W3) | 100 | 35 | 35 | 20 | 45 | 35 | 35 | 35 | 35 | 35 | 35 |
| Ratio (L2/W3) (%) of second crown lug groove length (L2) to crown land portion width (W3) | 100 | 35 | 35 | 20 | 45 | 35 | 35 | 35 | 35 | 35 | 35 |
| Ratio (L3/W3) (%) of first crown sipe piece length (L3) to crown land portion width (W3) | 40 | 100 | 40 | 40 | 40 | 30 | 45 | 40 | 40 | 40 | 40 |
| Ratio (L4/W3) (%) of second crown sipe piece length (L4) to crown land portion width (W3) | 40 | 100 | 40 | 40 | 40 | 30 | 45 | 40 | 40 | 40 | 40 |
| Angle (θ3) (degrees) of first crown sipe piece | 45 | 45 | 45 | 45 | 45 | 45 | 45 | 10 | 30 | 60 | 80 |
| Performance on snow and ice (index number) | 100 | 90 | 100 | 100 | 91 | 95 | 100 | 95 | 98 | 98 | 95 |
| Steering stability (index number) | 100 | 102 | 112 | 102 | 112 | 107 | 107 | 107 | 107 | 107 | 107 |

Based on the results of the tests, it can be confirmed that the tires of the examples allow performance on snow and ice and steering stability to be improved in a well-balanced manner as compared to the comparative examples.

A tire may have a large number of sipes in order to improve performance on snow and ice. In recent years, even for such a tire that has excellent performance on snow and ice, high steering stability on a dry road surface is demanded.

In Japanese Patent Laid-Open Publication No. 2010-285035, a crown land portion is not formed in a block shape and thus high performance on snow and ice cannot be achieved. Therefore, further improvement is required for the tire of Japanese Patent Laid-Open Publication No. 2010-285035 in order to achieve both performance on snow and ice and steering stability.

A tire according to an embodiment of the present invention improves grooves and sipes of a crown land portion and improves performance on snow and ice and steering stability in a well-balanced manner.

A tire according to an embodiment of the present invention includes in a tread part: multiple main grooves that each continuously extend in a tire circumferential direction; and multiple land portions that are demarcated by the main grooves. The main grooves include a pair of crown main grooves. The land portions include a crown land portion that is demarcated between the pair of crown main grooves.

The crown land portion includes: first crown lug grooves that each extend from one of the crown main grooves to a tire axial direction inner side and are each terminated within the crown land portion; second crown lug grooves that each extend from the other one of the crown main grooves to a tire axial direction inner side and are each terminated within the crown land portion; and first crown sipes that are respectively formed at tire circumferential direction positions different from those of the first crown lug grooves and the second crown lug grooves and each communicatively connect the pair of the crown main grooves. The first crown sipes each include: a one-side crown sipe piece that extends from one of the crown main grooves to a tire axial direction inner side; an other-side crown sipe piece that is not positioned on an extension line of the one-side crown sipe piece and extends from the other one of the crown main grooves to a tire axial direction inner side; and a connecting crown sipe piece that connects the one-side crown sipe piece and the other-side crown sipe piece.

In a tire according to an embodiment of the present invention, it is desirable that the one-side crown sipe piece and the other-side crown sipe piece each extend in an arc shape, and the connecting crown sipe piece linearly extend.

In a tire according to an embodiment of the present invention, it is desirable that the connecting crown sipe piece have a depth smaller than those of the one-side crown sipe piece and the other-side crown sipe piece.

In a tire according to an embodiment of the present invention, it is desirable that the one-side crown sipe piece and the other-side crown sipe piece be inclined in the same direction, and the connecting crown sipe piece be inclined in an opposite direction to that of the one-side crown sipe piece and the other-side crown sipe piece.

In a tire according to an embodiment of the present invention, it is desirable that the first crown lug grooves and the second crown lug grooves each extend in an arc shape.

In a tire according to an embodiment of the present invention, it is desirable that the crown land portion further include: second crown sipes that each extend from one of the crown main grooves to a tire axial direction inner side and are each terminated within the crown land portion; and third crown sipes that each extend from the other one of the crown main grooves to a tire axial direction inner side and are each terminated within the crown land portion, and, in the tire circumferential direction, each of the second crown sipes be positioned on the other-side crown sipe piece side of the one-side crown sipe piece, and each of the third crown sipes be positioned on the one-side crown sipe piece side of the other-side crown sipe piece.

In a tire according to an embodiment of the present invention, it is desirable that the second crown sipes and the third crown sipes each extend in an arc shape.

In a tire according to an embodiment of the present invention, it is desirable that the main grooves further include shoulder main grooves that are each formed between a crown main groove and a tread edge, the land portions further include a pair of middle land portions that are each demarcated by a crown main groove and a shoulder main groove, each of the middle land portions have first middle lug grooves that each extend from a crown main groove to a tire axial direction outer side and are each terminated within the each of the middle land portions, and a tire circumferential direction pitch of the first middle lug grooves be two times a tire circumferential direction pitch of the first crown lug grooves or the second crown lug grooves.

In a tire according to an embodiment of the present invention, it is desirable that each of the first middle lug grooves oppose a first crown lug groove or a second crown lug groove across a crown main groove.

In a tire according to an embodiment of the present invention, it is desirable that the first crown lug grooves and the second crown lug grooves be inclined in the same direction, and the first middle lug grooves be inclined in an opposite direction to that of the first crown lug grooves and the second crown lug grooves.

In a tire according to an embodiment of the present invention, the crown land portion includes the first crown lug grooves that each extend from one of crown main grooves to a tire axial direction inner side and are each terminated within the crown land portion, the second crown lug grooves that each extend from the other one of the crown main grooves to a tire axial direction inner side and are each terminated within the crown land portion, and the first crown sipes that are respectively formed at tire circumferential direction positions different from those of the first crown lug grooves and the second crown lug grooves and each communicatively connect the pair of the crown main grooves.

Such first crown lug grooves and second crown lug grooves can suppress a decrease in rigidity of the crown land portion and allow excellent steering stability of the tire on a dry road surface to be achieved. Further, due to the first crown lug grooves and the second crown lug grooves, the crown land portion allows a high snow column shearing force to be obtained, and, due to an edge effect of the first crown sipes, the crown land portion can improve the performance on snow and ice of the tire.

In a tire according to an embodiment of the present invention, the first crown sipes each include the one-side crown sipe piece that extends from one of the crown main grooves to a tire axial direction inner side; the other-side crown sipe piece that is not positioned on an extension line of the one-side crown sipe piece and extends from the other one of the crown main grooves to a tire axial direction inner side; and the connecting crown sipe piece that connects the one-side crown sipe piece and the other-side crown sipe piece.

Such first crown sipes can suppress a decrease in the rigidity of the crown land portion and allow excellent steering stability of the tire to be achieved. Further, the first crown sipes can achieve an edge effect in both the tire circumferential direction and the tire axial direction and thus allow performance on snow and ice of the tire in a front-rear direction and a left-right direction to be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A tire, comprising:
   a tread part having a plurality of main grooves each continuously extending in a tire circumferential direction, and a plurality of land portions demarcated by the main grooves,
   wherein the main grooves include a pair of crown main grooves, the land portions include a crown land portion demarcated between the pair of crown main grooves, the crown land portion includes a plurality of first crown lug grooves each extending from one of the crown main grooves to a tire axial direction inner side and terminated within the crown land portion, a plurality of second crown lug grooves each extending from the other one of the crown main grooves to the tire axial direction inner side and terminated within the crown land portion, and a plurality of first crown sipes formed respectively at tire circumferential direction positions different from positions of the first and second crown lug grooves and each communicatively connecting the pair of crown main grooves, and each of the first crown sipes includes a first side crown sipe piece extending from one of the crown main grooves to the tire axial direction inner side, a second side crown sipe piece not positioned on an extension line of the first side crown sipe piece and extending from the other one of the crown main grooves to the tire axial direction inner side, and a connecting crown sipe piece connecting the first side crown sipe piece and the second side crown sipe piece such that each of the first side crown sipe piece and the second side crown sipe piece is extending in an arc shape and that the connecting crown sipe piece is linearly extending, each of the first crown lug grooves and the second crown lug grooves is extending in an arc shape such that the arc shape of the first side crown sipe piece is curved in a same direction as the arc shape of the first crown lug grooves and that the arc shape of the second side crown sipe piece is curved in a same direction as the arc shape of the second crown lug grooves, each of the first crown lug grooves has a tire axial direction length in a range of 20% to 45% of a width of the crown land portion, and each of the second crown lug grooves has a tire axial direction length in a range of 20% to 45% of the width of the crown land portion.

2. The tire according to claim 1, wherein the connecting crown sipe piece has a depth which is smaller than depths of the first side crown sipe piece and the second side crown sipe piece.

3. The tire according to claim 1, wherein the first side crown sipe piece and the second side crown sipe piece are inclined in a same direction, and the connecting crown sipe piece is inclined in an opposite direction with respect to directions of the first side crown sipe piece and the second side crown sipe piece.

4. The tire according to claim 2, wherein the first side crown sipe piece and the second side crown sipe piece are inclined in a same direction, and the connecting crown sipe piece is inclined in an opposite direction with respect to directions of the first side crown sipe piece and the second side crown sipe piece.

5. The tire according to claim 2, wherein the crown land portion includes a plurality of second crown sipes each extending from one of the crown main grooves to the tire axial direction inner side and terminated within the crown land portion, and a plurality of third crown sipes each extending from the other one of the crown main grooves to the tire axial direction inner side and terminated within the crown land portion, and in the tire circumferential direction, each of the second crown sipes is positioned on a second side crown sipe piece side of the first side crown sipe piece, and each of the third crown sipes is positioned on a first side crown sipe piece side of the second side crown sipe piece.

6. The tire according to claim 1, wherein the first side crown sipe piece has the arc shape that has a curvature radius of a groove center line in a range of 10 mm to 30 mm, and the second side crown sipe piece has the arc shape that has a curvature radius of a groove center line in a range of 10 mm to 30 mm.

7. The tire according to claim 1, wherein the pair of crown main grooves is linearly extending such that each of the crown main grooves has a substantially constant groove width that is in a range of 4% to 6% of the tread ground contact width.

8. The tire according to claim 1, wherein each of the first crown lug grooves and each of the second crown lug grooves have arcs that are convex in different directions from each other.

9. The tire according to claim 1, wherein each of the first crown lug grooves with respect to the tire circumferential direction at a communicating part between the each of the first crown lug grooves and a respective one of the crown main grooves has an angle in a range of 40 to 80 degrees, and each of the second crown lug grooves with respect to the tire circumferential direction at a communicating part between the each of the second crown lug grooves and a respective one of the crown main grooves has an angle in a range of 40 to 80 degrees.

10. The tire according to claim 1, wherein the first crown sipes are formed at tire circumferential direction positions different from tire circumferential direction positions of the first crown lug grooves and the second crown lug grooves.

11. The tire according to claim 1, wherein the first side crown sipe piece has a tire axial direction length in a range of 30% to 45% of a width of the crown land portion.

12. The tire according to claim 1, wherein each of the first crown sipes is formed such that an angle between the connecting crown sipe piece and the first side crown sipe piece is in a range of 90 to 150 degrees.

13. A tire, comprising:
a tread part having a plurality of main grooves each continuously extending in a tire circumferential direction, and a plurality of land portions demarcated by the main grooves,
wherein the main grooves include a pair of crown main grooves, the land portions include a crown land portion demarcated between the pair of crown main grooves, the crown land portion includes a plurality of first crown lug grooves each extending from one of the crown main grooves to a tire axial direction inner side and terminated within the crown land portion, a plurality of second crown lug grooves each extending from the other one of the crown main grooves to the tire axial direction inner side and terminated within the crown land portion, and a plurality of first crown sipes formed respectively at tire circumferential direction positions different from positions of the first and second crown lug grooves and each communicatively connecting the pair of crown main grooves, and each of the first crown sipes includes a first side crown sipe piece extending from one of the crown main grooves to the tire axial direction inner side, a second side crown sipe piece not positioned on an extension line of the first side crown sipe piece and extending from the other one of the crown main grooves to the tire axial direction inner side, and a connecting crown sipe piece connecting the first side crown sipe piece and the second side crown sipe piece such that each of the first side crown sipe piece and the second side crown sipe piece is extending in an arc shape and that the connecting crown sipe piece is linearly extending, each of the first crown lug grooves and the second crown lug grooves is extending in an arc shape such that the arc shape of the first side crown sipe piece is curved in a same direction as the arc shape of the first crown lug grooves and that the arc shape of the second side crown sipe piece is curved in a same direction as the arc shape of the second crown lug grooves, the crown land portion includes a plurality of second crown sipes each extending from one of the crown main grooves to the tire axial direction inner side and terminated within the crown land portion, and a plurality of third crown sipes each extending from the other one of the crown main grooves to the tire axial direction inner side and terminated within the crown land portion, and in the tire circumferential direction, each of the second crown sipes is positioned on a second side crown sipe piece side of the first side crown sipe piece, and each of the third crown sipes is positioned on a first side crown sipe piece side of the second side crown sipe piece.

14. The tire according to claim 13, wherein each of the second crown sipes and the third crown sipes is extending in an arc shape.

15. A tire, comprising:
a tread part having a plurality of main grooves each continuously extending in a tire circumferential direction, and a plurality of land portions demarcated by the main grooves,
wherein the main grooves include a pair of crown main grooves, the land portions include a crown land portion demarcated between the pair of crown main grooves, the crown land portion includes a plurality of first crown lug grooves each extending from one of the crown main grooves to a tire axial direction inner side and terminated within the crown land portion, a plurality of second crown lug grooves each extending from the other one of the crown main grooves to the tire axial direction inner side and terminated within the crown land portion, and a plurality of first crown sipes formed respectively at tire circumferential direction positions different from positions of the first and second crown lug grooves and each communicatively connecting the pair of crown main grooves, and each of the first crown sipes includes a first side crown sipe piece extending from one of the crown main grooves to the tire axial direction inner side, a second side crown sipe piece not positioned on an extension line of the first side crown sipe piece and extending from the other one of the crown main grooves to the tire axial direction inner side, and a connecting crown sipe piece connecting the first side crown sipe piece and the second side crown sipe piece such that each of the first side crown sipe piece and the second side crown sipe piece is extending in an arc shape and that the connecting crown sipe piece is linearly extending, each of the first crown lug grooves and the second crown lug grooves is extending in an arc shape such that the arc shape of the first side crown sipe piece is curved in a same direction as the arc shape of the first crown lug grooves and that the arc shape of the second side crown sipe piece is curved in a same direction as the arc shape of the second crown lug grooves, the plurality of main grooves includes a plurality of shoulder main grooves each formed between one of the crown main grooves and a tread edge, the plurality of land portions includes a pair of middle land portions each demarcated by one of the crown main grooves and one of the shoulder main grooves, each of the middle land portions has a plurality of first middle lug grooves each extending from a respective one of the crown main grooves to a tire axial direction outer side and terminated within the each of the middle land portions, and the plurality of first middle lug grooves has a tire circumferential direction pitch which is two times a tire circumferential direction pitch of the first crown lug grooves or the second crown lug grooves.

16. The tire according to claim 15, wherein each of the first middle lug grooves opposes a respective one of the first crown lug grooves or second crown lug grooves across a respective one of the crown main grooves.

17. The tire according to claim 16, wherein the first crown lug grooves and the second crown lug grooves are inclined in a same direction, and the first middle lug grooves are inclined in an opposite direction with respect to directions of the first crown lug grooves and the second crown lug grooves.

18. The tire according to claim 15, wherein the first crown lug grooves and the second crown lug grooves are inclined in a same direction, and the first middle lug grooves are inclined in an opposite direction with respect to directions of the first crown lug grooves and the second crown lug grooves.

19. A tire, comprising:
a tread part having a plurality of main grooves each continuously extending in a tire circumferential direction, and a plurality of land portions demarcated by the main grooves,
wherein the main grooves include a pair of crown main grooves, the land portions include a crown land portion demarcated between the pair of crown main grooves, the crown land portion includes a plurality of first crown lug grooves each extending from one of the crown main grooves to a tire axial direction inner side and terminated within the crown land portion, a plurality of second crown lug grooves each extending from the other one of the crown main grooves to the tire axial direction inner side and terminated within the crown land portion, and a plurality of first crown sipes formed respectively at tire circumferential direction positions different from positions of the first and second crown lug grooves and each communicatively connecting the pair of crown main grooves, and each of the first crown sipes includes a first side crown sipe piece extending from one of the crown main grooves to the tire axial direction inner side, a second side crown sipe piece not positioned on an extension line of the first side crown sipe piece and extending from the other one of the crown main grooves to the tire axial direction inner side, and a connecting crown sipe piece connecting the first side crown sipe piece and the second side crown sipe piece such that each of the first side crown sipe piece and the second side crown sipe piece is extending in an arc shape and that the connecting crown sipe piece is linearly extending, each of the first crown lug grooves and the second crown lug grooves is extending in an arc shape such that the arc shape of the first side crown sipe piece is curved in a same direction as the arc shape of the first crown lug grooves and that the arc shape of the second side crown sipe piece is curved in a same direction as the arc shape of the second crown lug grooves, each of the first crown lug grooves has the arc shape that has a curvature radius of a groove center line in a range of 10 mm to 30 mm, and each of the second crown lug grooves has the arc shape that has a curvature radius of a groove center line in a range of 10 mm to 30 mm.

20. The tire according to claim 19, wherein each of the first crown lug grooves has a tire axial direction length in a range of 20% to 45% of a width of the crown land portion, and each of the second crown lug grooves has a tire axial direction length in a range of 20% to 45% of the width of the crown land portion.

\* \* \* \* \*